United States Patent
Liang

(10) Patent No.: US 8,966,344 B2
(45) Date of Patent: Feb. 24, 2015

(54) DATA PROTECTING METHOD, MEMORY CONTROLLER AND MEMORY STORAGE DEVICE

(71) Applicant: Phison Electronics Corp., Miaoli (TW)

(72) Inventor: Ming-Jen Liang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 76 days.

(21) Appl. No.: 13/957,446

(22) Filed: Aug. 2, 2013

(65) Prior Publication Data

US 2014/0372833 A1    Dec. 18, 2014

(30) Foreign Application Priority Data

Jun. 18, 2013 (TW) .............................. 102121610 A

(51) Int. Cl.
*G11C 29/00* (2006.01)
*G06F 11/10* (2006.01)

(52) U.S. Cl.
CPC .................................. *G06F 11/1068* (2013.01)
USPC ........................................................ 714/773

(58) Field of Classification Search
CPC ....... G06F 11/00; G06F 1/00; G06F 11/0787; G06F 3/0688; G06F 3/0661; G06F 3/061; G06F 11/1048; G06F 11/2089; G06F 11/1666; G06F 11/20; G06F 11/1405; G06F 13/385; G06F 12/0246; G06F 11/0766; G06F 11/1435; G06F 11/073; G11C 16/16; G11C 29/82
See application file for complete search history.

(56) References Cited

U.S. PATENT DOCUMENTS

| 8,683,295 | B1 * | 3/2014 | Syu et al. | 714/763 |
| 8,868,842 | B2 * | 10/2014 | Yano et al. | 711/135 |
| 2010/0281204 | A1 * | 11/2010 | Yano et al. | 711/103 |

* cited by examiner

*Primary Examiner* — Guerrier Merant
(74) *Attorney, Agent, or Firm* — Jianq Chyun IP Office

(57) ABSTRACT

A data protecting method, a memory controller, and a memory storage device are provided. The data protecting method includes following steps. A first flush command and a first write command instructing to write a first data are received from a host system. A first error correcting code and a corresponding second error correcting code having different protection capabilities are generated according to the first data. A second write command instructing to write a second data is received. After the first write command is received, a second flush command is received from the host system, and the second error correcting code corresponding to the first data is then written into a rewritable non-volatile memory module. A second error correcting code corresponding to the second data is not generated or is generated but not written into the rewritable non-volatile memory module. Thereby, data from the host system is protected.

24 Claims, 7 Drawing Sheets

DATA PROTECTING METHOD, MEMORY CONTROLLER AND MEMORY STORAGE DEVICE

CROSS-REFERENCE TO RELATED APPLICATION

This application claims the priority benefit of Taiwan application serial no. 102121610, filed on Jun. 18, 2013. The entirety of the above-mentioned patent application is hereby incorporated by reference herein and made a part of this specification.

BACKGROUND

1. Technology Field

The present invention generally relates to a data protecting method, and more particularly, to a data protecting method for a rewritable non-volatile memory module, a memory controller, and a memory storage device.

2. Description of Related Art

Along with the widespread of digital cameras, cell phones, and MP3 players in recently years, the consumers' demand to storage media has increased drastically. Rewritable non-volatile memory (for example, flash memory) is one of the most adaptable storage media to aforementioned portable multimedia devices due to its many characteristics such as data non-volatility, low power consumption, small volume, and non-mechanical structure.

In a multi level cell (MLC) NAND flash memory module, each physical erasing unit includes a plurality of physical programming units, and these physical programming units are categorized into lower physical programming units and upper physical programming units. If a system error occurs when an upper physical programming unit is programmed, an error may be produced in the data in the lower physical programming unit corresponding to the same word line. Besides, when data is written, the lower physical programming units have to be programmed before the upper physical programming units are programmed. A host system may write data into a rewritable non-volatile memory module through write commands. The host system may also issue a flush command to clear data within a logical range, so that the data is not stored in a volatile memory. Generally, the cleared data is written into the rewritable non-volatile memory module, and the host system considers that data before the flush command is issued has been completely and safely written. However, if data is written into a lower physical programming unit before the host system issues the flush command and the upper physical programming unit corresponding to the same word line is programmed and a system error occurs after the host system issues the flush command, an error may be produced in the data in the lower physical programming unit. Thereby, how to protect the data has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data protecting method, a memory controller, and a memory storage device, in which data in a rewritable non-volatile memory module is protected.

An exemplary embodiment of the present invention provides a data protecting method adapted to a rewritable non-volatile memory module. The rewritable non-volatile memory module includes a plurality of physical erasing units. The data protecting method includes following steps. A first flush command is received from a host system. After the first flush command is received, a first write command is received from the host system, where the first write command instructs to write a first data. A first error correcting code and a second error correcting code corresponding to the first data are generated according to the first data, where the protection capability of the second error correcting code is different from that of the first error correcting code. A second write command instructing to write a second data is received. After the first write command is received, a second flush command is received from the host system, where the second flush command instructs to write the first data and the second data in a buffer memory into the rewritable non-volatile memory module. The first data, the first error correcting code, and the second data are written into the rewritable non-volatile memory module. After the second flush command is received, the second error correcting code corresponding to the first data is written into the rewritable non-volatile memory module. No corresponding second error correcting code is generated for the second data, or a second error correcting code corresponding to the second data is generated but not written into the rewritable non-volatile memory module.

An exemplary embodiment of the present invention provides a memory storage device. The memory storage device includes a connector, the rewritable non-volatile memory module described above, and a memory controller. The connector is configured to couple to a host system. The memory controller is coupled to the connector and the rewritable non-volatile memory module. The memory controller receives a first flush command from the host system, and after receiving the first flush command, the memory controller receives a first write command from the host system, where the first write command instructs to write a first data. The memory controller also generates a first error correcting code and a second error correcting code corresponding to the first data according to the first data, where the protection capability of the second error correcting code is different from that of the first error correcting code. The memory controller also receives a second write command instructing to write a second data from the host system. After receiving the first write command and the second write command, the memory controller receives a second flush command from the host system, where the second flush command instructs to write the first data and the second data in a buffer memory into the rewritable non-volatile memory module. The memory controller writes the first data, the first error correcting code, and the second data into the rewritable non-volatile memory module. After receiving the second flush command, the memory controller writes the second error correcting code corresponding to the first data into the rewritable non-volatile memory module. The memory controller does not generate a corresponding second error correcting code for the second data, or the memory controller generates a second error correcting code corresponding to the second data but does not write it into the rewritable non-volatile memory module.

An exemplary embodiment of the present invention provides a memory controller. The memory controller includes a host interface, a memory interface, and a memory management circuit. The host interface is configured to couple to a host system. The memory interface is configured to couple to a rewritable non-volatile memory module. The memory management circuit is coupled to the host interface and the memory interface. The memory management circuit receives a first flush command from the host system, and after receiving the first flush command, the memory management circuit receives a first write command from the host system, where the first write command instructs to write a first data. The memory management circuit also generates a first error correcting code and a second error correcting code corresponding to the first data according to the first data, where the protection capability of the second error correcting code is different from that of the first error correcting code. The memory management circuit receives a second write command instructing to write a second data from the host system. After receiving the first write command and the second write command, the memory management circuit receives a second flush command from the host system, where the second flush command instructs to write the first data and the second data in a buffer memory into the rewritable non-volatile memory module. The memory management circuit writes the first data, the first error correcting code, and the second data into the rewritable non-volatile memory module. After receiving the second flush command, the memory management circuit writes the second error correcting code corresponding to the first data into the rewritable non-volatile memory module. The memory management circuit does not generate a corresponding second error correcting code for the second data, or the memory management circuit generates a second error correcting code corresponding to the second data but does not write it into the rewritable non-volatile memory module.

As described above, in a data protecting method, a memory controller, and a memory storage device provided by exemplary embodiments of the present invention, a second error correcting code is written into a rewritable non-volatile memory module after a second flush command is received, so that data received before the second flush command can be protected.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the present invention will be described and become more apparent from the detailed description of exemplary embodiments when read in conjunction with accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1A:
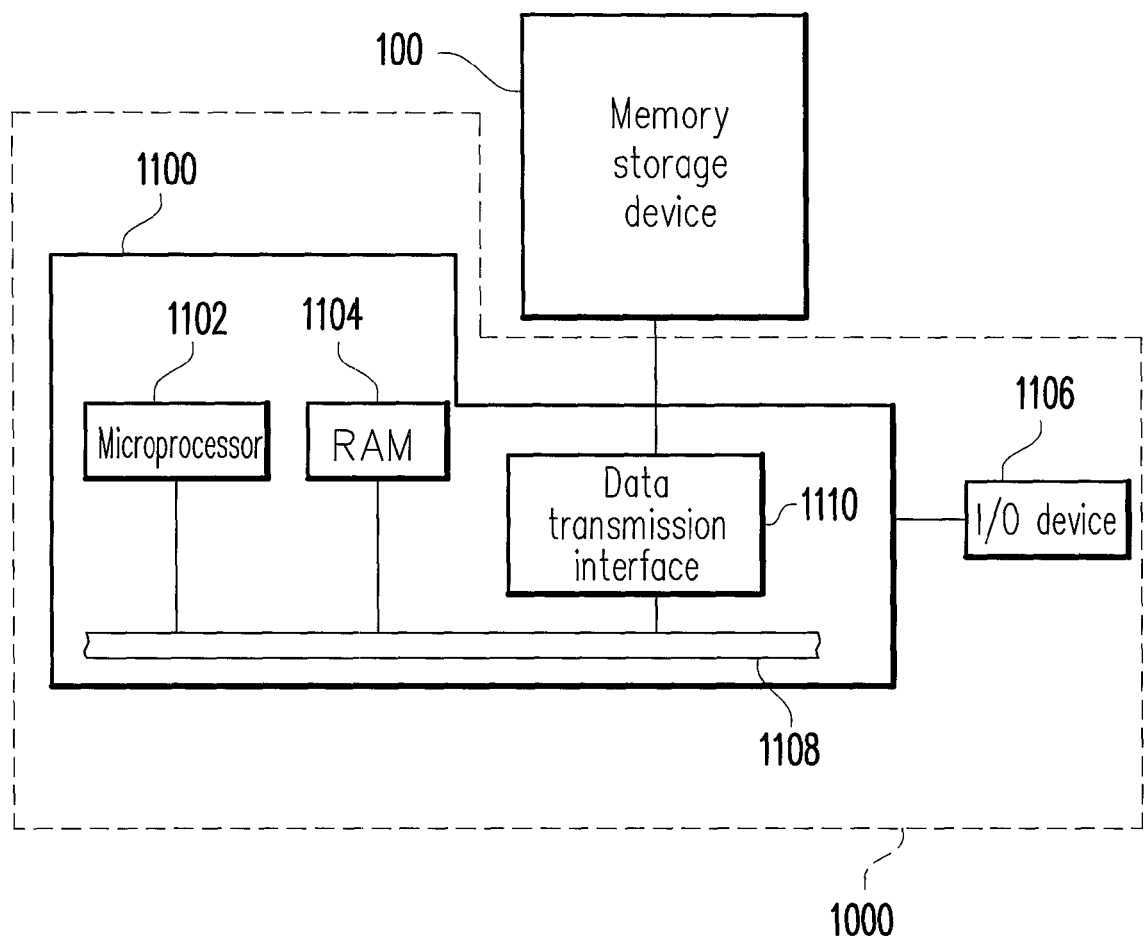
FIG. 1A illustrates a host system and a memory storage device according to an exemplary embodiment.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a rewritable non-volatile memory module and a controller (also referred to as a control circuit). A memory storage device is usually used with a host system so that the host system can write data into or read data from the memory storage device.

FIG. 1A illustrates a host system and a memory storage device according to an exemplary embodiment.

Figure 1B:
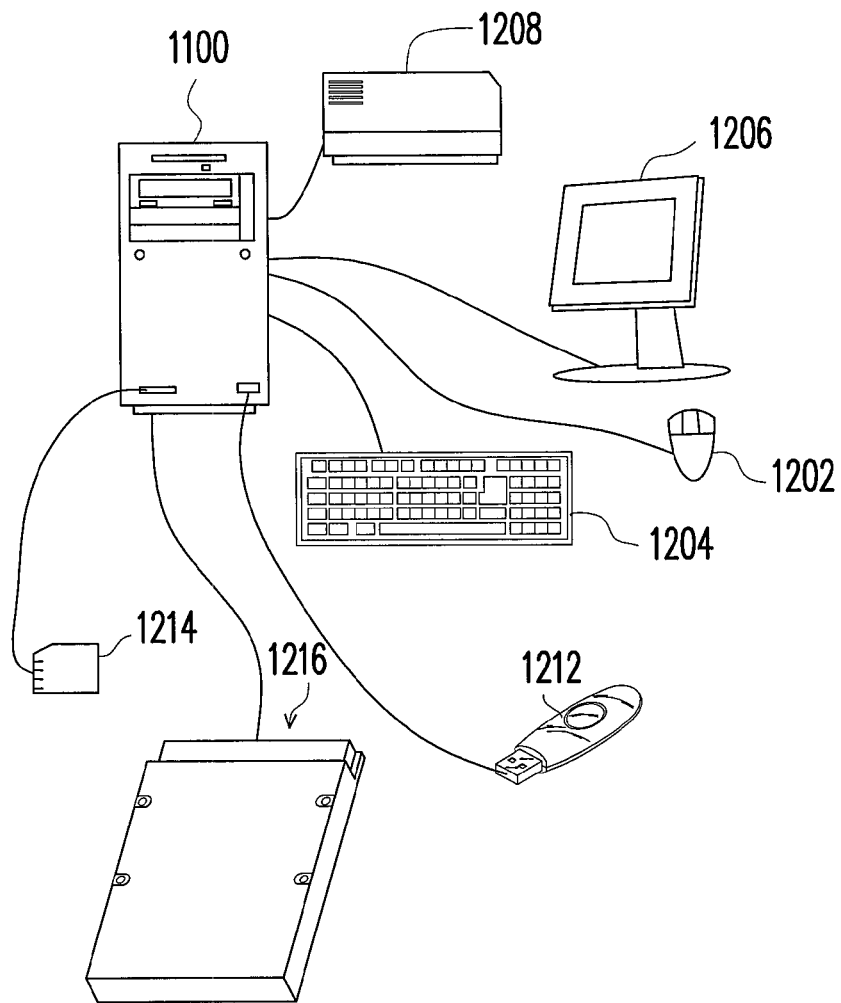
FIG. 1B is a diagram of a computer, an input/output device, and a memory storage device according to an exemplary embodiment.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 is a rewritable non-volatile memory storage device, such as the flash drive 1212, the memory card 1214, or the solid state drive (SSD) 1216 illustrated in FIG. 1B.

Figure 1C:
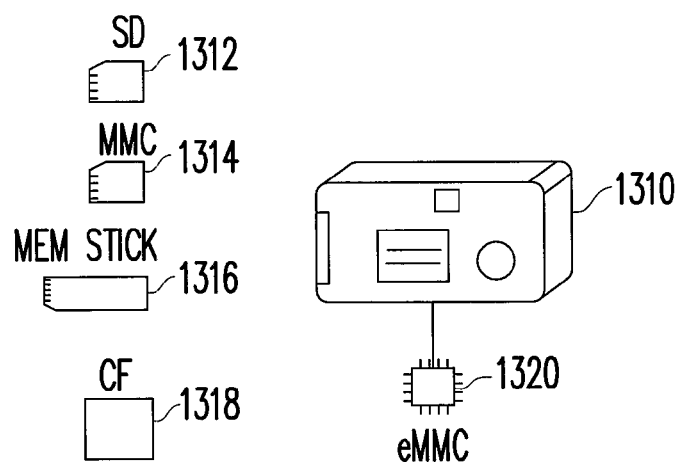
FIG. 1C is a diagram of a host system and a memory storage device according to an exemplary embodiment.

Generally speaking, the host system 1000 can be substantially any system that works with the memory storage device 100 to store data. Even though the host system 1000 is described as a computer system in the present exemplary embodiment, in another exemplary embodiment of the present invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2A:
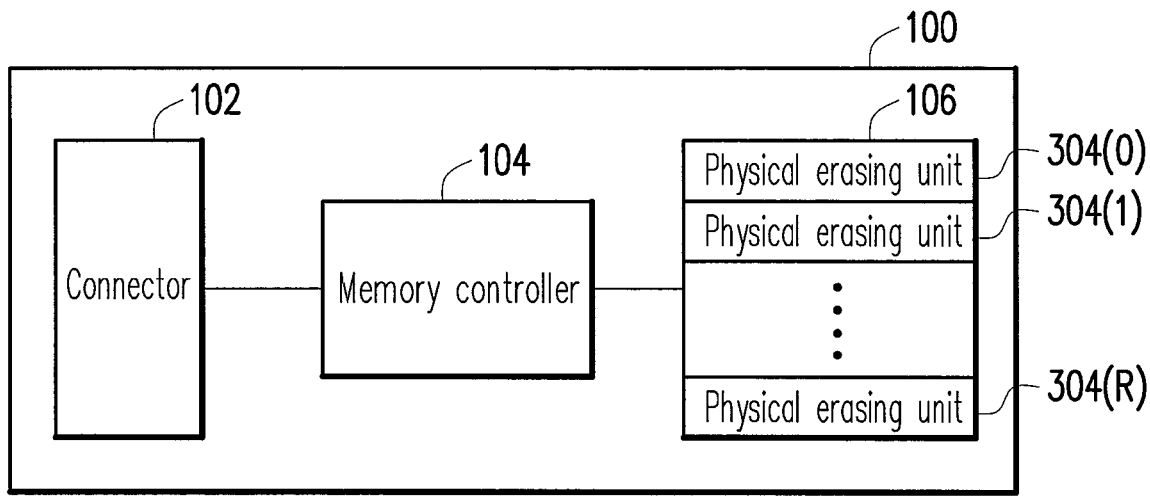
FIG. 2A is a schematic block diagram of the memory storage device in FIG. 1A.

FIG. 2A is a schematic block diagram of the memory storage device in FIG. 1A.

Referring to FIG. 2A, the memory storage device 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the SD interface standard, the ultra high speed-I (UHS-I) interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or control instructions implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erasing units 304(0)-304(R). The physical erasing units 304(0)-304(R) may belong to a same memory die or different memory dies. Each physical erasing unit has a plurality of physical programming units. The physical programming units belonging to the same physical erasing unit can be individually written but have to be erased all together. Each physical erasing unit may be composed of 128 physical programming units. However, the present invention is not limited thereto, and each physical erasing unit may also be composed of 64, 256, or any other number of physical programming units.

To be specific, physical erasing unit is the smallest unit for erasing data. Namely, each physical erasing unit contains the least number of memory cells that are erased all together. Physical programming unit is the smallest unit for programming data. Namely, physical programming unit is the smallest unit for writing data. Each physical programming unit usually includes a data bit area and a redundant bit area. The data bit area includes a plurality of physical access addresses for storing user data, and the redundant bit area is used for storing system data (for example, error checking and correcting codes (ECCs)). In the present exemplary embodiment, the data bit area of each physical programming unit includes 4 physical access addresses, and the size of each physical access address is 512 bytes (B). However, the size and number of the physical access addresses are not limited in the present invention, and in other exemplary embodiments, a data bit area may also include 8, 16, or any other greater or smaller number of physical access addresses. The physical erasing units may be physical blocks, and the physical programming units may be physical pages or physical sectors.

In the present exemplary embodiment, the rewritable non-volatile memory module 106 is a multi level cell (MLC) NAND flash memory module (i.e., each memory cell stores two data bits). To be specific, memory cells on the same word line constitute an upper physical programming unit and a lower physical programming unit, and the two bits in each memory cell belong to different physical programming units. In other words, the physical programming units in each physical erasing unit are grouped into a plurality of lower physical programming units and a plurality of upper physical programming units. Thereinafter, a lower physical programming unit and an upper physical programming unit on the same word line are considered as being corresponding to each other. Generally, the writing speed of a lower physical programming unit is faster than that of an upper physical programming unit. Besides, a lower physical programming unit has to be programmed before the corresponding upper physical programming unit is programmed. However, the rewritable non-volatile memory module 106 may also be a trinary level cell (TLC) NAND flash memory module, any other flash memory module, or any memory module with the same characteristics, which is not limited in the present invention.

Figure 2B:
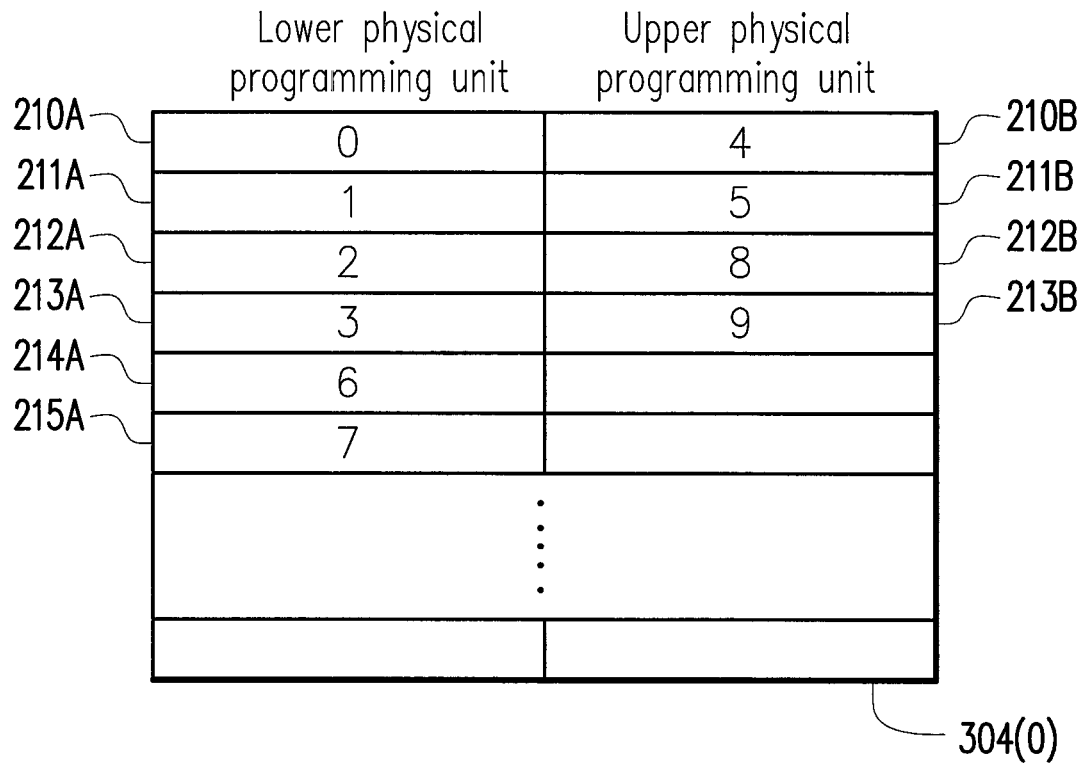
FIG. 2B is a diagram of a physical erasing unit according to an exemplary embodiment.

FIG. 2B is a diagram of a physical erasing unit according to an exemplary embodiment.

Referring to FIG. 2B, the physical erasing unit 304(0) at least includes lower physical programming units 210A-215A and upper physical programming units 210B-213B. The lower physical programming unit 210A is corresponding to the upper physical programming unit 210B, the lower physical programming unit 211A is corresponding to the upper physical programming unit 211B, and so on. In the present exemplary embodiment, the memory controller 104 alternatively writes data into one or more lower physical programming units and one or more upper physical programming units according to a programming sequence. For example, the numbers in the physical programming units in FIG. 2B indicate the programming sequence. To be specific, the lower physical programming units 210A, 211A, 212A, and 213A are first programmed, the upper physical programming units 210B and 211B, the lower physical programming units 214A and 215A, and the upper physical programming units 212B and 213B are then sequentially programmed, and so on. However, the present invention is not limited thereto, and the memory controller 104 may also write data according to any other programming sequence. For example, data can be sequentially written into the lower physical programming unit 210A, the upper physical programming unit 210B, the lower physical programming unit 211A, the upper physical programming unit 211B, and the lower physical programming unit 212A, and so on.

Figure 3:
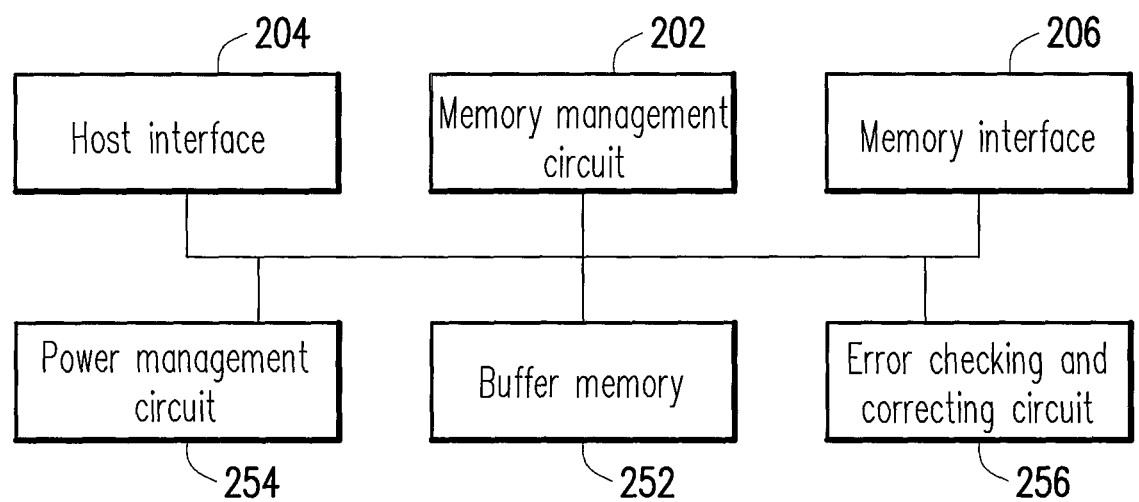
FIG. 3 is a schematic block diagram of a memory controller according to an exemplary embodiment.

FIG. 3 is a schematic block diagram of a memory controller according to an exemplary embodiment.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform various data writing, data reading, and data erasing operations. Below, the operation of the memory management circuit 202 will be described, and the operation of the memory controller 104 can be referred to the description related to the operation of the memory management circuit 202 therefore will not be described.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage device 100 is in operation, the control instructions are executed by the microprocessor unit to carry out data writing, data reading, and data erasing operations.

In another exemplary embodiment of the present invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a boot code. When the memory controller 104 is enabled, the microprocessor unit first executes the boot code to load the control instructions from the rewritable non-volatile memory module 106 into the RAM of the memory management circuit 202. Thereafter, the microprocessor unit runs the control instructions to perform various data writing, reading, and erasing operations.

In yet another exemplary embodiment of the present invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage physical erasing units of the rewritable non-volatile memory module 106. The memory writing unit is configured to issue a write command to the rewritable non-volatile memory module 106 to write data into the rewritable non-volatile memory module 1106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the SATA standard. However, the present invention is not limited thereto, and the host interface 204 may also comply with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106. However, in another embodiment, the buffer memory 252 may also be disposed outside the memory controller 104 and coupled with the memory controller 104.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 performs the ECC procedure on the data according to the ECC code.

Figure 4:
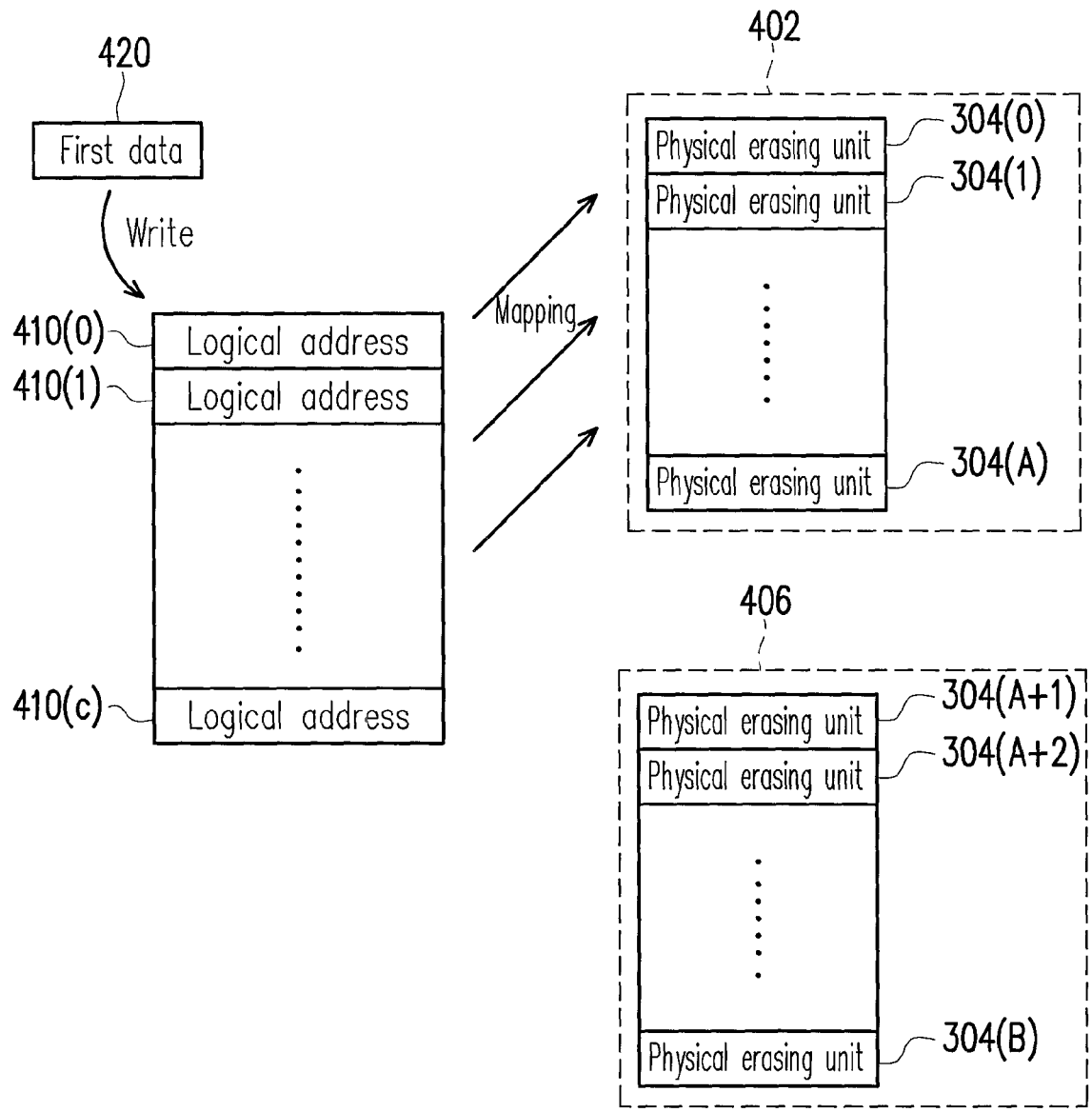
FIG. 4 is a diagram illustrating an example of managing a rewritable non-volatile memory module according to an exemplary embodiment.

FIG. 4 is a diagram illustrating an example of managing a rewritable non-volatile memory module according to an exemplary embodiment.

It should be understood that while describing operations performed on the physical erasing units of the rewritable non-volatile memory module 106, the terms like "select", "group", and "associate" refer to logical operations performed on the physical erasing units. Namely, the actual positions of the physical erasing units in the rewritable non-volatile memory module 106 are not changed and the operations are logically performed on the physical erasing units of the rewritable non-volatile memory module 106.

Referring to FIG. 4, the memory controller 104 logically groups the physical erasing units 304(0)-304(R) into a plurality of areas, such as a storage area 402 and a system area 406. The physical erasing units in the storage area 402 are used for storing data from the host system 1000. The storage area 402 includes a plurality of spare physical erasing units, and no valid data is stored in these spare physical erasing units. Because a physical erasing unit cannot be programmed again before it is erased, when the memory controller 104 is about to write data into the storage area 402 or merge valid data, the memory controller 104 uses these spare physical erasing units. Or, when a physical erasing unit is damaged, a spare physical erasing unit can be selected for replacing the damaged physical erasing unit. When there is no more spare physical erasing unit in the storage area 402 and it is impossible to generate any spare physical erasing unit by merging valid data, the memory controller 104 announces that the entire memory storage device 100 enters a write protect state and cannot be used for writing data. In another exemplary embodiment, the memory controller 104 may further define a replacement area and uses physical erasing units in the replacement area for replacing damaged physical erasing units, which is not limited in the present invention. On the other hand, the physical erasing units in the system area 406 are used for recording system data. Herein the system data includes the manufacturer and model of the memory chip, the number of physical erasing units in the memory chip, and the number of physical programming units in each physical erasing unit, etc. Particularly, the numbers of the physical erasing units in the storage area 402 and the system area 406 vary with different memory specifications.

In the present exemplary embodiment, the memory controller 104 configures logical addresses 410(0)-410(C) such that data in the physical erasing units in the storage area 402 can be accessed conveniently. For example, when the memory storage device 100 is formatted by an operating system through a file system (for example, FAT 32), the logical addresses 410(0)-410(C) are respectively mapped to some physical programming units in the storage area 402 (i.e., the logical addresses 410(0)-410(C) are mapped to some physical erasing units in the storage area 402). The memory management circuit 202 establishes a logical address-physical programming unit mapping table to record the mapping relationship between the logical addresses and the physical programming unit. In the present exemplary embodiment, the size of each one of the logical addresses 410(0)-410(C) is the same as the size of each physical programming unit (i.e., the logical addresses can also be referred to as logical pages). However, the present invention is not limited thereto, and in other exemplary embodiments, the size of each one of the logical addresses 410(0)-410(C) may also be the size of a physical erasing unit or any other size.

The host system 1000 may issue a write command to the memory management circuit 202 to instruct the memory management circuit 202 to write a first data 420 into at least one logical address. For example, the first data 420 is to be written into the logical addresses 410(0) and 410(1). After receiving the write command, the memory management circuit 202 selects a physical erasing unit from the storage area 402. At least a part of the physical programming units in this physical erasing unit are not programmed yet. The memory management circuit 202 writes the first data 420 into two non-programmed physical programming units and maps the logical addresses 410(0) and 410(1) to these two physical programming units.

The host system 1000 may also issue a flush command to the memory management circuit 202. The flush command instructs the memory management circuit 202 to write the first data 420 stored in the buffer memory 252 into the rewritable non-volatile memory module 106. If the memory storage device 100 encounters a power failure after the host system 1000 issues the write command and the flush command, the host system 1000 considers that the first data 420 has been correctly stored into the rewritable non-volatile memory module 106. Contrarily, if the host system 1000 does not issue the flush command after the write command and the memory storage device 100 encounters a power failure after receiving the write command, the first data 420 may be lost (for example, the first data 420 is temporarily stored in the buffer memory 252 and not written into the rewritable non-volatile memory module 106 yet). In the case that no flush command is issued, the host system 1000 handles the loss of the first data 420 by itself.

In the present exemplary embodiment, the memory management circuit 202 first receives a first flush command from the host system 1000. Thus, data received from the host system 1000 before the first flush command is written into the rewritable non-volatile memory module 106. After receiving the first flush command, the memory management circuit 202 receives a first write command from the host system 1000, where the first write command instructs the memory management circuit 202 to write the first data 420. The memory management circuit 202 generates a first error correcting code according to the first data 420 and temporarily stores the first data 420 into the buffer memory 252. The memory management circuit 202 does not instantly write the first data 420 into the rewritable non-volatile memory module 106 once it receives the first data 420. Instead, the memory management circuit 202 writes the first data 420 in the buffer memory 252 into the rewritable non-volatile memory module 106 according to its own schedule. Similarly, the memory management circuit 202 writes the first error correcting code into the rewritable non-volatile memory module 106 according to its own schedule. The memory management circuit 202 also generates a second error correcting code corresponding to the first data according to the first data 420. The protection capability of the second error correcting code is different from that of the first error correcting code. For example, the first error correcting code only protects the first data 420, while the second error correcting code also protects other data besides the first data 420. Or, only the first data 420 is protected by the first error correcting code, while a part of the first data 420 and a part of other data are protected by the second error correcting code. Or, for example, the second error correcting code can be used to correct 80 error bits, while the first error correcting code can only be used to correct 40 error bits. In the present exemplary embodiment, the "protection capability of an error correcting code" refers to the protectable data range, the protectable data length, or the number of correctable error bits to the error correcting code. The memory management circuit 202 also receives a second write command from the host system 1000, where the second write command instructs the memory management circuit 202 to write a second data. Similarly, the memory management circuit 202 writes the second data into the rewritable non-volatile memory module 106 according to its own schedule.

After receiving the first write command and the second write command, the memory management circuit 202 receives a second flush command from the host system 1000. The second flush command instructs the memory management circuit 202 to write the first data 420 and the second data in the buffer memory 252 into the rewritable non-volatile memory module 106. After receiving the second flush command, the memory management circuit 202 writes the second error correcting code corresponding to the first data 420 into the rewritable non-volatile memory module 106. Thus, if the memory storage device 100 encounters a power failure after it receives the second flush command and an error occurs in the first data 420 stored in the rewritable non-volatile memory module 106, the first error correcting code or the second error correcting code can be used to correct the error. In particularly, the memory management circuit 202 generates a first error correcting code corresponding to the second data but does not generate a second error correcting code corresponding to the second data. Or, the memory management circuit 202 generates a second error correcting code corresponding to the second data but does not write the second error correcting code into the rewritable non-volatile memory module 106. In other words, in the present exemplary embodiment, the second error correcting code is used to protect the data to be written by a specific write command, and the memory management circuit 202 does not generate a corresponding second error correcting code for all data to be written into the rewritable non-volatile memory module 106. It should be mentioned that the memory management circuit 202 may generate the second error correcting code corresponding to the first data before or after it receives the second flush command, which is not limited in the present invention.

Aforementioned first error correcting code and second error correcting code may be parity checking codes, channel coding, or any other type of codes. For example, the first error correcting code and the second error correcting code may be hamming codes, low density parity check (LDPC) codes, turbo codes, or Reed-solomon (RS) codes. However, the present invention is not limited thereto.

In an exemplary embodiment, the first error correcting code is stored in the redundant bit area of a physical programming unit (i.e., the first error correcting code is the said ECC code). The error correcting code in the redundant bit area is generated according to the data stored in the data bit area of the same physical programming unit. In other words, in the present exemplary embodiment, the first error correcting code is generated according to the first data 420 in a single physical programming unit. For example, the memory management circuit 202 generates the corresponding first error correcting code and writes the first error correcting code into the redundant bit area when it writes the first data 420 into a data bit area. Or, the memory management circuit 202 generates the first error correcting code when the first data 420 is stored in the buffer memory 252 and then respectively writes the first data 420 and the first error correcting code corresponding to the first data 420 into the data bit area and the redundant bit area of a physical programming unit. Thereinafter, "the first data 420 corresponding to a physical programming unit" refers to the part of the first data 420 that is about to be written into or already stored in the physical programming unit.

Contrarily, the second error correcting code is generated according to the first data 420 stored in multiple physical programming units. To be specific, in the present exemplary embodiment, the memory management circuit 202 generates the second error correcting code based on the ratio of m:n. If the ratio of the length of the first data 420 to be protected to the length of the second error correcting code is m:n, the first data 420 in every m physical programming units is corresponding to a second error correcting code with length of n physical programming units, where m and n are positive integers. Generally speaking, the positive integer m is greater than the positive integer n. However, the present invention is not limited thereto. Besides, the values of the positive integers m and n are not limited in the present invention. The memory management circuit 202 can generate the corresponding second error correcting code when it receives the first data 420 or when the first data 420 is stored in the buffer memory 252. Or, the memory management circuit 202 can generate the second error correcting code after the first data 420 is written into a plurality of physical programming units. However, the present invention is not limited thereto. Different patterns for generating a second error correcting code will be explained with reference to exemplary embodiments below.

Herein "according to" means "by using at least". Namely, the description of "generating a second error correcting code according to a first data" includes different implementations of "generating a second error correcting code by using a first data and any other data". Namely, the first data 420 can be all the data or part of the data used for generating the second error correcting code. Below, the definition of "according to" will not be explained again.

Figure 5:
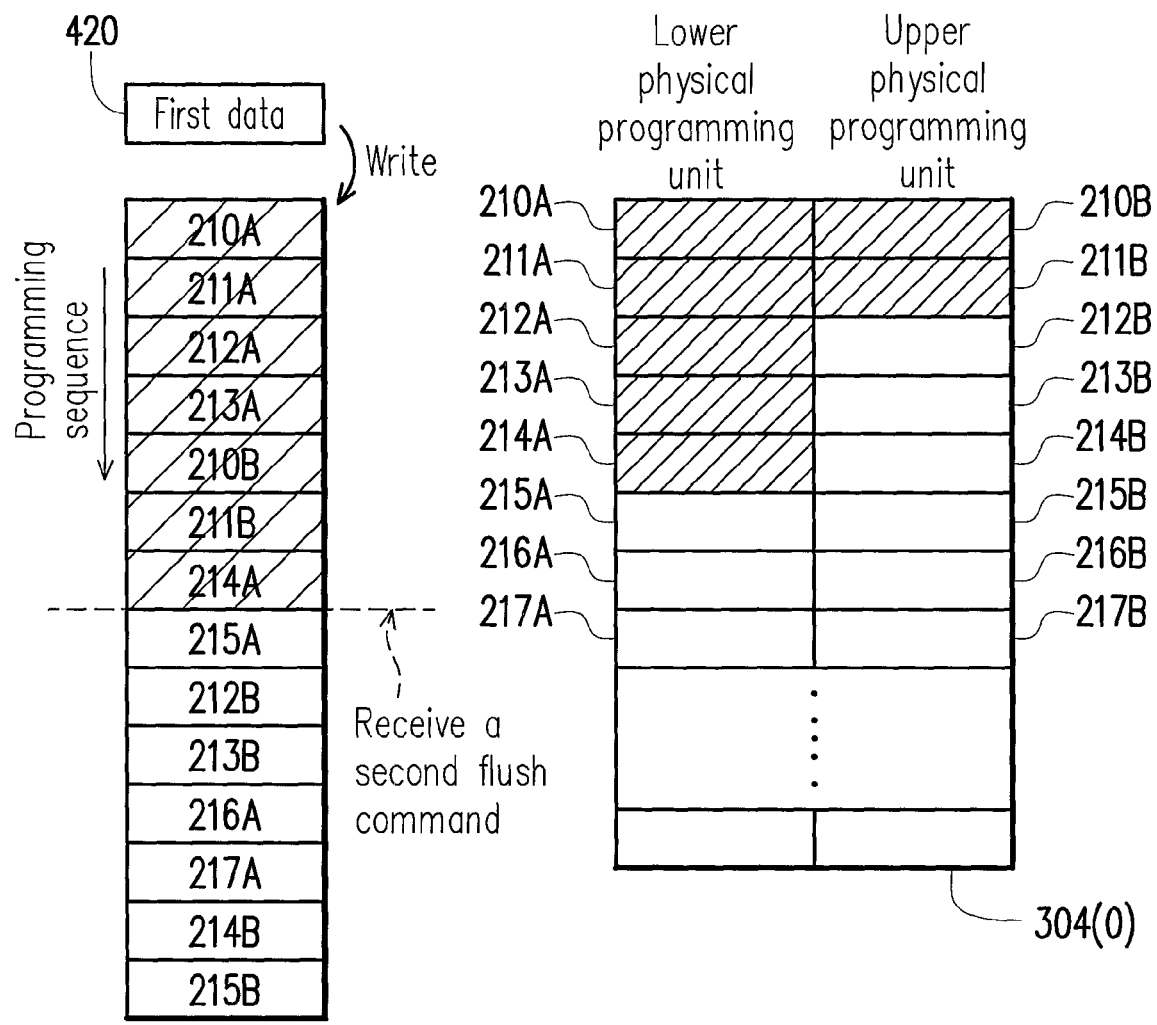
FIG. 5 is a diagram illustrating how a first error correcting code and a second error correcting code are generated according to an exemplary embodiment.

FIG. 5 is a diagram illustrating how a first error correcting code and a second error correcting code are generated according to an exemplary embodiment.

Referring to FIG. 5, a MLC NAND flash memory module is taken as an example. In the exemplary embodiment illustrated in FIG. 5, after the memory management circuit 202 receives a flush command (also referred to as a first flush command), it further receives a write command instructing to write a first data 420. The length of the first data 420 may be 7 physical programming units. The memory management circuit 202 selects a physical erasing unit and writes the first data 420 into 7 physical programming units based on the programming sequence described above. For example, the memory management circuit 202 selects the physical erasing unit 304(0) and sequentially writes the first data 420 into the lower physical programming units 210A, 211A, 212A, and 213A, the upper physical programming units 210B and 211B, and the lower physical programming unit 214A. After that, the memory management circuit 202 receives another flush command (also referred to as a second flush command) from the host system. It should be noted that herein the upper physical programming units 212B, 213B, and 214B are not programmed. The memory management circuit 202 generates the second error correcting code according to at least the first data 420 stored in the lower physical programming units 212A, 213A, and 214A and writes the second error correcting code into a physical erasing unit. Or, the memory management circuit 202 generates the second error correcting code according to the first data 420 stored in the lower physical programming units 210A-214A. However, the present invention is not limited thereto.

In an exemplary embodiment, after the memory management circuit 202 receives the first data 420, it stores the first data 420 into the buffer memory 252 instead of writing it into the physical erasing unit 304(0). However, when the second error correcting code is generated is not limited in the present invention. For example, among the first data 420, only a part of the first data 420 that is corresponding to the lower physical programming units 212A, 213A, and 214A in the buffer memory 252 is used to generate the corresponding second error correcting code. Subsequently, the memory management circuit 202 writes the second error correcting code into the rewritable non-volatile memory module 106 after it receives the second flush command.

In another exemplary embodiment, the memory management circuit 202 generates the second error correcting code according to the first data 420 corresponding to a predetermined number of physical programming units, and the predetermined number is greater than 1. To be specific, the first data 420 is written from the physical programming unit 210A to the physical programming unit 214A based on the programming sequence illustrated in FIG. 5. After receiving the second flush command, the memory management circuit 202 locates a predetermined number of physical programming units forwards based on the programming sequence by starting from the current physical programming unit 214A and generates an error correcting code according to the first data 420 corresponding to these physical programming units. For example, assuming the predetermined number to be 3, the memory management circuit 202 generates the second error correcting code according to a part of the first data 420 corresponding to the physical programming units 210B, 211B, and 214A. However, the value of the predetermined number is not limited in the present invention. Or, once receiving the first data 420, the memory management circuit 202 generates a second error correcting code according to the first data 420 corresponding to every 3 physical programming units, and after receiving the second flush command, the memory management circuit 202 determines which second error correcting codes would be written into the rewritable non-volatile memory module 106.

In the exemplary embodiments described above, the data used for generating a second error correcting code is corresponding to a same write command. However, in another exemplary embodiment, the data used for generating a second error correcting code is corresponding to multiple write commands. For example, herein it is assumed that the length of the first data 420 is 3 physical programming units, the first data 420 is written into the physical programming units 210A, 211A, and 212A, and the next write command (also referred to as a second write command) instructs to write another data into the physical programming units 213A, 210B, 211B, and 214A. After receiving these two write commands, the memory management circuit 202 receives the second flush command. The memory management circuit 202 generates the second error correcting code at least according to the first data corresponding to the physical programming unit 212A and the data corresponding to the physical programming units 213A and 214A.

In another exemplary embodiment, regarding the data to be written by a write command, the memory management circuit 202 does not generate a corresponding second error correcting code or generates a corresponding second error correcting code but does not write the second error correcting code into the rewritable non-volatile memory module 106. For example, in FIG. 5, one write command instructs to write data with length of one physical programming unit. Namely, the data corresponding to the physical programming units 210A, 211A, 212A, 213A, 210B, 211B, and 214A is indicated by 7 different write commands. The memory management circuit 202 generates a second error correcting code according to the data corresponding to the physical programming units 212A, 213A, and 214A but does not generate any second error correcting code according to the data corresponding to the physical programming units 210A, 210B, 211A, and 212B. Or, the memory management circuit 202 generates a second error correcting code according to the data corresponding to the physical programming units 210A, 210B, 211A, and 212B but does not write the second error correcting code into the rewritable non-volatile memory module 106. In an exemplary embodiment, every time a write command and data to be written are received, the memory management circuit 202 generates a corresponding second error correcting code. However, after receiving a second flush command, the memory management circuit 202 only writes part of the second error correcting codes into the rewritable non-volatile memory module 106.

In yet another exemplary embodiment, the data used for generating a second error correcting code is distributed in different physical erasing units. For example, if the memory management circuit 202 manages the rewritable non-volatile memory module 106 in physical erasing units, when the first data 420 is to be written, the memory management circuit 202 generates a parent physical erasing unit and one or more child physical erasing units. Herein there may be data to be protected in both the parent physical erasing unit and the child physical erasing units, and the memory management circuit 202 generates the second error correcting code according to the data to be protected in the parent physical erasing unit and the child physical erasing units. However, operations regarding the parent physical erasing unit and the child physical erasing units should be understood by those having ordinary knowledge in the art, therefore it will not be explained herein.

In the present exemplary embodiment, the physical programming units 211A and 211B are adjacent to the physical programming units 212A and 212B. When an error occurs in the data in the physical programming units 212A and 212B, the data in the physical programming units 211A and 211B may contain an error. Thus, in an exemplary embodiment, the memory management circuit 202 generates a second error correcting code according to the data corresponding to the physical programming units 211A and 211B.

The memory management circuit 202 writes the second error correcting code into the physical erasing unit 304(0). However, the present invention is not limited thereto, and the memory management circuit 202 may also select another physical erasing unit exclusively used for storing second error correcting codes. The memory management circuit 202 can continue to write data into the physical programming units 215A, 212B, 213B, 216A, 217A, 214B, and 215B. If a power failure is encountered when data is written into the physical programming unit 213B, an error may be produced in the data stored in the physical programming unit 213A. In this case, the memory management circuit 202 corrects the error according to the second error correcting code.

To be specific, when the memory storage device 100 is re-started, the memory management circuit 202 first determines that the physical programming units in the physical erasing unit 304(0) (also referred to as a first physical erasing unit) are not completely programmed. Then, the memory management circuit 202 reads the first error correcting code stored in the redundant bit area of each physical programming unit in the physical erasing unit 304(0) and determines whether the data in the corresponding data bit area contains any error according to the first error correcting code. For example, the memory management circuit 202 determines whether the data stored in the data bit area of the physical programming unit 213A contains any error according to the first error correcting code stored in the redundant bit area of the physical programming unit 213A (also referred to as a first physical programming unit). If the data contains an error (also referred to as a first error), the memory management circuit 202 first tries to correct the error by using the first error correcting code. If the first error correcting code cannot correct the error (i.e., the number of error bits in the physical programming unit 213A is greater than the number of bits correctable to the first error correcting code), the memory management circuit 202 determines whether the physical programming unit 213A is within the protection capability of the corresponding second error correcting code. In the present exemplary embodiment, the protected range of the corresponding second error correcting code includes at least the physical programming units 212A, 213A, and 214A, and besides, the number of error bits in the physical programming unit 213A is smaller than or equal to the number of bits correctable to the second error correcting code. Thus, the memory management circuit 202 corrects the data stored in the data bit area of the physical programming unit 213A according to the second error correcting code.

In another exemplary embodiment, the rewritable non-volatile memory module 106 is a trinary level cell (TLC NAND flash memory module. Thus, the 3 physical programming units on a same word line can be categorized into a lower physical programming unit, a middle physical programming unit, and an upper physical programming unit. Similarly, if a lower physical programming unit stores the first data 420 and one or both of the middle physical programming unit and the upper physical programming unit on the same word line are not programmed after a second flush command is received, the memory management circuit 202 generates a second error correcting code according to at least the first data 420 stored in the lower physical programming unit (or the first data stored in the lower physical programming unit and the middle physical programming unit).

Figure 6:
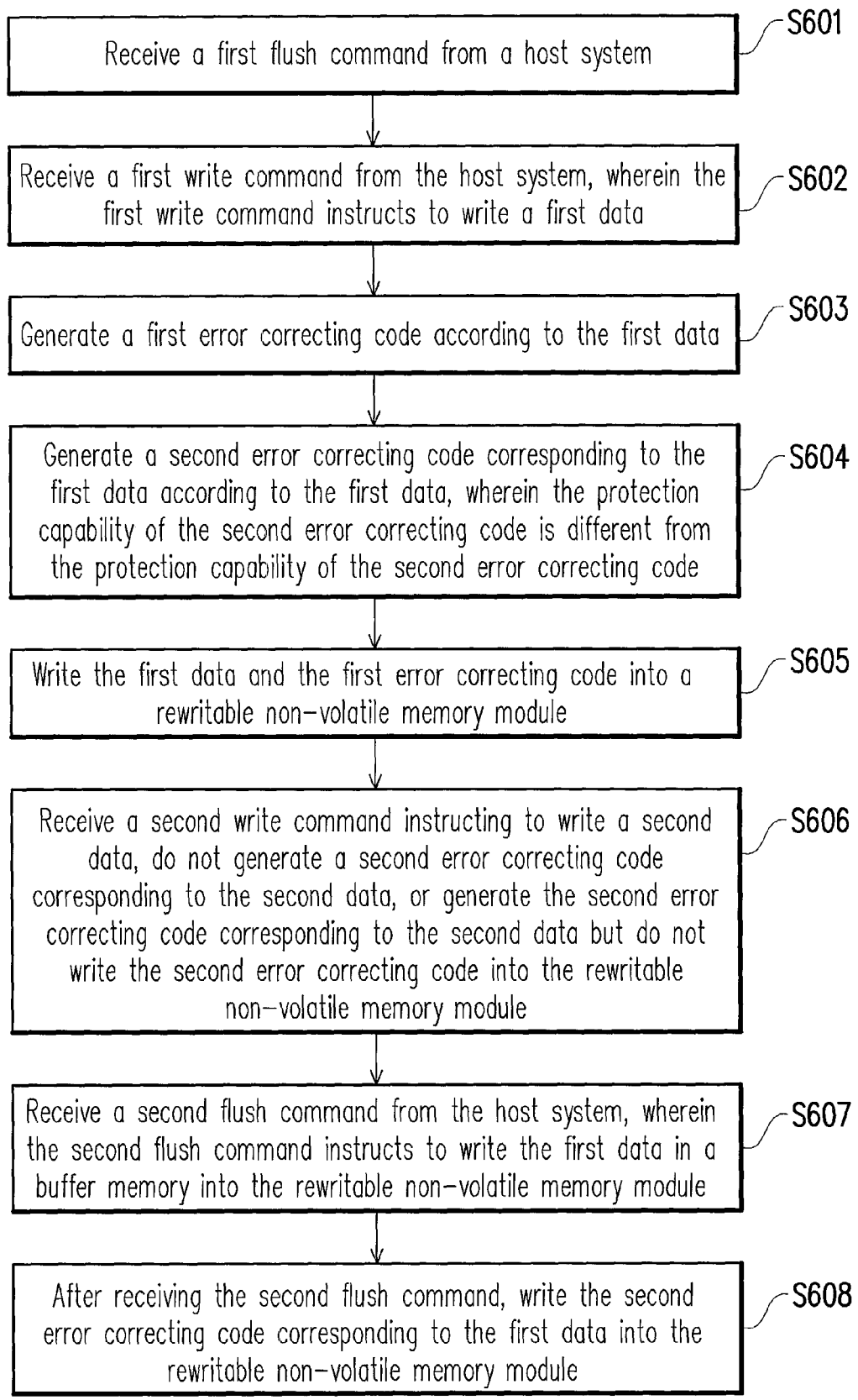
FIG. 6 is a flowchart of a data protecting method according to an exemplary embodiment.

FIG. 6 is a flowchart of a data protecting method according to an exemplary embodiment.

Referring to FIG. 6, in step S601, a first flush command is received from a host system. In step S602, a first write command instructing to write a first data is received from the host system. In step S603, a first error correcting code and a second error correcting code corresponding to the first data are generated according to the first data, where the protection capability of the second error correcting code is different from that of the first error correcting code. In step S604, a second write command instructing to write a second data is received from the host system. In step S605, a second flush command is received from the host system, where the second flush command instructs to write the first data and the second data in a buffer memory into a rewritable non-volatile memory module. In step S606, the first data, the first error correcting code, and the second data are written into the rewritable non-volatile memory module. In step S607, after the second flush command is received, the second error correcting code corresponding to the first data is written into the rewritable non-volatile memory module. In step S608, no corresponding second error correcting code is generated for the second data, or a corresponding second error correcting code is generated for the second data but not written into the rewritable non-volatile memory module. Steps in FIG. 6 have been described in detail above therefore will not be further described herein. It should be noted that the execution sequence of the steps in FIG. 6 is not limited in the present invention. For example, step S604 can be executed before step S603, or step S606 can be executed before step S605, which is not limited in the present invention. In addition, steps in FIG. 6 can be implemented as a plurality of program codes or circuits. Moreover, the data protecting method in FIG. 6 can be performed independently or along with any embodiment described above, which is not limited in the present invention.

As described above, in a data protecting method, a memory controller, and a memory storage device provided by exemplary embodiments of the present invention, data received before a second flush command is protected. Besides, in an exemplary embodiment, only data corresponding to lower physical programming units is used for generating second error correcting codes, so that the memory space required for data protection can be reduced. Because only a small quantity of data is backed up (i.e., only the second error correcting codes are backed up) during a data writing process, the data writing process can be sped up. Additionally, since less memory space is used, the number of garbage collections is reduced, and accordingly the writing amplification is reduced.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A data protecting method for a rewritable non-volatile memory module, wherein the rewritable non-volatile memory module comprises a plurality of physical erasing units, the data protecting method comprising:

receiving a first flush command from a host system;

after receiving the first flush command, receiving a first write command from the host system, wherein the first write command instructs to write a first data;

generating a first error correcting code and a second error correcting code corresponding to the first data according to the first data, wherein a protection capability of the second error correcting code is different from a protection capability of the first error correcting code;

receiving a second write command, wherein the second write command instructs to write a second data;

after receiving the first write command and the second write command, receiving a second flush command from the host system, wherein the second flush command instructs to write the first data and the second data in a buffer memory into the rewritable non-volatile memory module;

writing the first data, the first error correcting code, and the second data into the rewritable non-volatile memory module;

after receiving the second flush command, writing the second error correcting code corresponding to the first data into the rewritable non-volatile memory module; and not generating a second error correcting code corresponding to the second data, or generating the second error correcting code corresponding to the second data but not writing the second error correcting code corresponding to the second data into the rewritable non-volatile memory module.

2. The data protecting method according to claim 1, wherein each of the physical erasing units comprises a plurality of physical programming units, among the first data, only a part of the first data corresponding to one of the physical programming units is used to generated the first error correcting code, and the second error correcting code corresponding to the first data is generated according to parts of the first data corresponding to multiple ones of the physical programming units.

3. The data protecting method according to claim 2, wherein the step of generating the second error correcting code corresponding to the first data comprises:

generating the second error correcting code according to a part of the first data corresponding to a predetermined number of the physical programming units, wherein the predetermined number is greater than 1.

4. The data protecting method according to claim 1, wherein each of the physical erasing units comprises a plurality of physical programming units, the physical programming units are grouped into a plurality of upper physical programming units and a plurality of lower physical programming units, and the step of generating the second error correcting code corresponding to the first data comprises:

generating the second error correcting code according to a part of the first data that is corresponding to at least one of the lower physical programming units.

5. The data protecting method according to claim 1, wherein each of the physical erasing units comprises a plurality of physical programming units, the physical programming units are grouped into a plurality of upper physical programming units and a plurality of lower physical programming units, wherein among the first data, only a part of the first data in the buffer memory that is corresponding to at least one of the lower physical programming units is used to generate the second error correcting code corresponding to the first data.

6. The data protecting method according to claim 5, wherein at least one of the upper physical programming units corresponding to the at least one lower physical programming unit is not programmed.

7. The data protecting method according to claim 1, wherein each of the physical erasing units comprises a plurality of physical programming units, the physical programming units are grouped into a plurality of upper physical programming units and a plurality of lower physical programming units, and the step of generating the second error correcting code corresponding to the first data comprises:
generating the second error correcting code according to a part of the first data in the buffer memory that is corresponding to at least one of the lower physical programming units and a part of the first data in the buffer memory that is corresponding to a second physical programming unit, wherein at least one of the upper physical programming units corresponding to the at least one lower physical programming unit is not programmed, and the second physical programming unit is adjacent to the at least one lower physical programming unit.

8. The data protecting method according to claim 1, wherein each of the physical erasing units comprises a plurality of physical programming units, each of the physical programming units comprises a data bit area and a redundant bit area, and the first error correcting code is stored in one of the redundant bit areas, the data protecting method further comprising:
after booting up, selecting a first physical erasing unit among the physical erasing units, wherein the physical programming units of the first physical erasing unit are not completely programmed;
checking whether data stored in the data bit areas of the first physical erasing unit contains an error according to the first error correcting code corresponding to the first data;
if the data stored in the data bit area of a first physical programming unit among the physical programming units of the first physical erasing unit contains a first error and the first error correcting code corresponding to the first data is not able to correct the first error, determining whether the first physical programming unit is within the protection capability of the second error correcting code corresponding to the first data; and
if the first physical programming unit is within the protection capability of the second error correcting code corresponding to the first data, correcting the first error according to the second error correcting code corresponding to the first data.

9. A memory storage device, comprising:
a connector, configured to couple to a host system;
a rewritable non-volatile memory module, comprising a plurality of physical erasing units; and
a memory controller, coupled to the connector and the rewritable non-volatile memory module, and configured to receive a first flush command from the host system, and to receive a first write command from the host system after receiving the first flush command, wherein the first write command instructs to write a first data,
wherein the memory controller is configured to generate a first error correcting code and a second error correcting code corresponding to the first data according to the first data, wherein a protection capability of the second error correcting code is different from a protection capability of the first error correcting code,
wherein the memory controller is configured to receive a second write command, wherein the second write command instructs to write a second data,
wherein the memory controller is configured to receive a second flush command from the host system after receiving the first write command and the second write command, wherein the second flush command instructs to write the first data and the second data in a buffer memory into the rewritable non-volatile memory module,
wherein the memory controller is configured to write the first data, the first error correcting code, and the second data into the rewritable non-volatile memory module,
wherein, the memory controller is configured to write the second error correcting code corresponding to the first data into the rewritable non-volatile memory module after receiving the second flush command,
wherein the memory controller is configured not to generate a second error correcting code corresponding to the second data, or to generate the second error correcting code corresponding to the second data but not to write the second error correcting code corresponding to the second data into the rewritable non-volatile memory module.

10. The memory storage device according to claim 9, wherein each of the physical erasing units comprises a plurality of physical programming units, among the first data, only a part of the first data corresponding to one of the physical programming units is used to generate the first error correcting code, and the second error correcting code corresponding to the first data is generated according to parts of the first data corresponding to multiple ones of the physical programming units.

11. The memory storage device according to claim 10, wherein the operation of the memory controller for generating the second error correcting code corresponding to the first data comprises:
the memory controller generates the second error correcting code according to a part of the first data corresponding to a predetermined number of the physical programming units, wherein the predetermined number is greater than 1.

12. The memory storage device according to claim 9, wherein each of the physical erasing units comprises a plurality of physical programming units, the physical programming units are grouped into a plurality of upper physical programming units and a plurality of lower physical programming units, and the operation of the memory controller for generating the second error correcting code corresponding to the first data comprises:
the memory controller generates the second error correcting code according to a part of the first data that is corresponding to at least one of the lower physical programming units.

13. The memory storage device according to claim 9, wherein each of the physical erasing units comprises a plurality of physical programming units, the physical programming units are grouped into a plurality of upper physical programming units and a plurality of lower physical programming units,
wherein among the first data, only a part of the first data in the buffer memory that is corresponding to at least one of the lower physical programming units is used to generate the second error correcting code corresponding to the first data.

14. The memory storage device according to claim 13, wherein at least one of the upper physical programming units corresponding to the at least one lower physical programming unit is not programmed.

15. The memory storage device according to claim 9, wherein each of the physical erasing units comprises a plurality of physical programming units, the physical programming units are grouped into a plurality of upper physical programming units and a plurality of lower physical programming units, and the operation of the memory controller for generating the second error correcting code corresponding to the first data comprises:

the memory controller generates the second error correcting code according to a part of the first data in the buffer memory that is corresponding to at least one of the lower physical programming units and a part of the first data in the buffer memory that is corresponding to a second physical programming unit, wherein at least one of the upper physical programming units corresponding to the at least one lower physical programming unit is not programmed, and the second physical programming unit is adjacent to the at least one lower physical programming unit.

16. The memory storage device according to claim 9, wherein each of the physical erasing units comprises a plurality of physical programming units, each of the physical programming units comprises a data bit area and a redundant bit area, the first error correcting code is stored in one of the redundant bit areas, and after the memory controller is boot up, the memory controller is further configured to select a first physical erasing unit among the physical erasing units, wherein the physical programming units of the first physical erasing unit are not completely programmed, wherein the memory controller is further configured to check whether data stored in the data bit areas of the first physical erasing unit contains an error according to, the first error correcting code corresponding to the first data, if the data stored in the data bit area of a first physical programming unit among the physical programming units of the first physical erasing unit contains a first error and the first error correcting code corresponding to the first data is not able to correct the first error, the memory controller is configured to determine whether the first physical programming unit is within the protection capability of the second error correcting code corresponding to the first data, if the first physical programming unit is within the protection capability of the second error correcting code corresponding to the first data, the memory controller is configured to correct the first error according to the second error correcting code.

17. A memory controller for a rewritable non-volatile memory module, the memory controller comprising:

a host interface, configured to couple to a host system;

a memory interface, configured to couple to the rewritable non-volatile memory module, wherein the rewritable non-volatile memory module comprises a plurality of physical erasing units; and a memory management circuit, coupled to the host interface and the memory interface, and configured to receive a first flush command from the host system, and receive a first write command from the host system after receiving the first flush command, wherein the first write command instructs to write a first data, wherein the memory management circuit is configured to generate a first error correcting code and a second error correcting code corresponding to the first data according to the first data, wherein a protection capability of the second error correcting code is different from a protection capability of the first error correcting code, wherein the memory management circuit is configured to receive a second write command, wherein the second write command instructs to write a second data, wherein the memory management circuit is configured to receive a second flush command from the host system after receiving the first write command and the second write command, wherein the second flush command instructs to write the first data and the second data in a buffer memory into the rewritable non-volatile memory module, wherein the memory management circuit is configured to write the first data, the first error correcting code, and the second data into the rewritable non-volatile memory module, wherein the memory management circuit is configured to write the second error correcting code corresponding to the first data into the rewritable non-volatile memory module after receiving the second flush command, wherein the memory management circuit is configured not to generate a second error correcting code corresponding to the second data, or to generate the second error correcting code corresponding to the second data but does not to write the second error correcting code corresponding to the second data into the rewritable non-volatile memory module.

18. The memory controller according to claim 17, wherein each of the physical erasing units comprises a plurality of physical programming units, among the first data, only a part of the first data corresponding to one of the physical programming units is used to generate the first error correcting code, and the second error correcting code corresponding to the first data is generated according to parts of the first data corresponding to multiple ones of the physical programming units.

19. The memory controller according to claim 18, wherein the operation of the memory management circuit for generating the second error correcting code corresponding to the first data comprises:

the memory management circuit generates the second error correcting code according to a part of the first data corresponding to a predetermined number of the physical programming units, wherein the predetermined number is greater than 1.

20. The memory controller according to claim 17, wherein each of the physical erasing units comprises a plurality of physical programming units, the physical programming units are grouped into a plurality of upper physical programming units and a plurality of lower physical programming units, and the operation of the memory management circuit for generating the second error correcting code corresponding to the first data comprises:

the memory management circuit generates the second error correcting code according to a part of the first data that is corresponding to at least one of the lower physical programming units.

21. The memory controller according to claim 17, wherein each of the physical erasing units comprises a plurality of physical programming units, the physical programming units are grouped into a plurality of upper physical programming units and a plurality of lower physical programming units, wherein among the first data, only a part of the first data in the buffer memory that is corresponding to at least one of the lower physical programming units is used to generate the second error correcting code corresponding to the first data.

22. The memory controller according to claim 21, wherein at least one of the upper physical programming units corresponding to the at least one lower physical programming unit is not programmed.

23. The memory controller according to claim 17, wherein each of the physical erasing units comprises a plurality of physical programming units, the physical programming units are grouped into a plurality of upper physical programming units and a plurality of lower physical programming units, and the operation of the memory management circuit for generating the second error correcting code corresponding to the first data comprises:

the memory management circuit generates the second error correcting code according to a part of the first data in the buffer memory that is corresponding to at least one of the lower physical programming units and a part of the first data in the buffer memory that is corresponding to a second physical programming unit, wherein at least one of the upper physical programming units corresponding to the at least one lower physical programming unit is not programmed, and the second physical programming unit is adjacent to the at least one lower physical programming unit.

24. The memory controller according to claim 17, wherein each of the physical erasing units comprises a plurality of physical programming units, each of the physical programming units comprises a data bit area and a redundant bit area, the first error correcting code is stored in one of the redundant bit areas, and after the memory management circuit is boot up, the memory management circuit is further configured to select a first physical erasing unit among the physical erasing units, wherein the physical programming units of the first physical erasing unit are not completely programmed, wherein the memory management circuit is further configured to check whether data stored in the data bit areas of the first physical erasing unit contains an error according to the first error correcting code corresponding to the first data, if the data stored in the data bit area of a first physical programming unit among the physical programming units of the first physical erasing unit contains a first error and the first error correcting code corresponding to the first data is not able to correct the first error, the memory management circuit is configured to determine whether the first physical programming unit is within the protection capability of the second error correcting code corresponding to the first data, if the first physical programming unit is within the protection capability of the second error correcting code corresponding to the first data, the memory management circuit is configured to correct the first error according to the second error correcting code.

* * * * *